US005717819A

United States Patent [19]

Emeott et al.

[11] Patent Number: 5,717,819

[45] Date of Patent: Feb. 10, 1998

[54] METHODS AND APPARATUS FOR ENCODING/DECODING SPEECH SIGNALS AT LOW BIT RATES

[75] Inventors: Stephen P. Emeott; Aaron M. Smith, both of Schaumburg, Ill.

[73] Assignee: Motorola, Inc., Schaumburg, Ill.

[21] Appl. No.: 430,974

[22] Filed: Apr. 28, 1995

[51] Int. Cl.[6] .................... G01L 3/02

[52] U.S. Cl. .................... 395/2.3; 395/2.1; 395/2.14; 395/2.17; 395/2.28; 395/2.34

[58] Field of Search .................... 395/2, 2.1, 2.12, 395/2.23, 2.28, 2.3–2.32, 2.34, 2.39, 2.67, 2.71

[56] References Cited

U.S. PATENT DOCUMENTS 3,740,476 6/1973 Atal et al. .................... 395/2.28
4,184,049 1/1980 Crochiere et al. .................... 395/2.12
4,797,926 1/1989 Bronson et al. .................... 395/2.23
4,899,385 2/1990 Ketchum et al. .................... 395/2.28
5,327,520 7/1994 Chen .................... 395/2.28
5,383,184 1/1995 Champion .................... 395/2.12
5,450,449 9/1995 Kroon .................... 395/2.28

*Primary Examiner*—Allen R. MacDonald
*Assistant Examiner*—Michael N. Opsasnick
*Attorney, Agent, or Firm*—James A. Coffing; George C. Pappas

[57] ABSTRACT

A voice encoder for use in low bit rate vocoding applications employs a method of encoding a plurality of digital information frames. This method includes the step of providing an estimate of the digital information frame, which estimate includes a frame shape characteristic. Further, a fundamental frequency associated with the digital information frame is identified and used to establish a shape window. Lastly, the frame shape characteristic is matched, within the shape window, with a predetermined shape function to produce a plurality of shape parameters.

25 Claims, 3 Drawing Sheets

METHODS AND APPARATUS FOR ENCODING/DECODING SPEECH SIGNALS AT LOW BIT RATES

FIELD OF THE INVENTION

The present invention relates generally to speech coders, and in particular to such speech coders that are used in low-to-very-low bit rate applications.

BACKGROUND OF THE INVENTION

It is well established that speech coding technology is a key component in many types of speech systems. As an example, speech coding enables efficient transmission of speech over wireline and wireless systems. Further, in digital speech transmission systems, speech coders (i.e., so-called vocoders) have been used to conserve channel capacity, while maintaining the perceptual aspects of the speech signal. Additionally, speech coders are often used in speech storage systems, where the vocoders are used to maintain a desired level of perceptual voice quality, while using the minimum amount of storage capacity.

Examples of speech coding techniques in the art may be found in both wireline and wireless telephone systems. As an example, landline telephone systems use a vocoding technique known as 16 kilo-bit per second (kbps) Low Delay code excited linear prediction (CELP). Similarly, cellular telephone systems in the U.S., Europe, and Japan use vocoding techniques known as 8 kbps vector sum excited linear prediction (VSELP), 13 kbps regular pulse excitation-long term prediction (RPE-LTP), and 6.7 kbps VSELP, respectively. Vocoders such as 4.4 kbps improved multi-band excitation (IMBE) and 4.6 kbps algebraic-CELP have further been adopted by mobile radio standards bodies as standard vocoders for private land mobile radio transmission systems.

The aforementioned vocoders use speech coding techniques that rely on an underlying model of speech production. A key element of this model is that a time-varying spectral envelope, referred to herein as the shape characteristic, represents information essential to speech perception performance. This information may then be extracted from the speech signal and encoded. Because the shape characteristic varies with time, speech encoders typically segment the speech signal into frames. The duration of each frame is usually chosen to be short enough, around 30 ms or less, so that the shape characteristic is substantially constant over the frame. The speech encoder can then extract the important perceptual information in the shape characteristic for each frame and encode it for transmission to the decoder. The decoder, in turn, uses this and other transmitted information to construct a synthetic speech waveform.

FIG. 1 shows a spectral envelope, which represents a frame shape characteristic for a single speech frame. This spectral envelope is in accordance with speech coding techniques known in the art. The spectral envelope is band-limited to Fs/2, where Fs is the rate at which the speech signal is sampled in the A/D conversion process prior to encoding. The spectral envelope might be viewed as approximating the magnitude spectrum of the vocal tract impulse response at the time of the speech frame utterance. One strategy for encoding the information in the spectral envelope involves solving a set of linear equations, well known in the art as normal equations, in order to find a set of all pole linear filter coefficients. The coefficients of the filter are then quantized and sent to a decoder. Another strategy for encoding the information involves sampling the spectral envelope at increasing harmonics of the fundamental frequency, Fo (i.e., the first harmonic 112, the second harmonic, the Lth harmonic 114, and so on up to the Kth harmonic 116), within the Fs/2 bandwidth. The samples of the spectral envelope, also known as spectral amplitudes, can then be quantized and transmitted to the decoder.

Despite the growing and relatively widespread usage of vocoders with bit rates between 4 and 16 kbps, vocoders having bit rates below 4 kbps have not had the same impact in the marketplace. Examples of these coders in the prior art include the so-called 2.4 kbps LPC-10e Federal Standard 1014 vocoder, the 2.4 kbps multi-band excitation (MBE) vocoder, and the 2.4 kbps sinusoidal transform coder (STC). Of these vocoders, the 2.4 kbps LPC-10e Federal Standard is the most well known, and is used in government and defense secure communications systems. The primary problem with these vocoders is the level of voice quality that they can achieve. Listening tests have shown that the voice quality of the LPC-10e vocoder and other vocoders having bit rates lower than 4 kbps is still noticeably inferior to the voice quality of existing vocoders having bit rates well above 4 kbps.

Nonetheless, the number of potential applications for higher quality vocoders with bit rates below 4 kbps continues to grow. Examples of these applications include, inter alia, digital cellular and land mobile radio systems, low cost consumer radios, moderately-priced satellite systems, digital speech encryption systems and devices used to connect base stations to digital central offices via low cost analog telephone lines.

The foregoing applications can be generally characterized as having the following requirements: 1) they require vocoders having low to very-low bit rates (below 4 kbps); 2) they require vocoders that can maintain a level of voice quality comparable to that of current landline and cellular telephone vocoders; and 3) they require vocoders that can be implemented in real-time on inexpensive hardware devices. Note that this places tight constraints on the total algorithmic and processing delay of the vocoder.

Accordingly, a need exists for a real-time vocoder having a perceived voice quality that is comparable to vocoders having bit rates at or above 4 kbps, while using a bit rate that is less than 4 kbps.

DETAILED DESCRIPTION OF THE PREFERRED EMBODIMENT

The present invention encompasses a voice encoder and decoder for use in low bit rate vocoding applications. In particular, a method of encoding a plurality of digital information frames includes providing an estimate of the digital information frame, which estimate includes a frame shape characteristic. Further, a fundamental frequency associated with the digital information frame is identified and used to establish a shape window. Lastly, the frame shape characteristic is matched, within the shape window, with a predetermined shape function to produce a plurality of shape parameters. In the foregoing manner, redundant and irrelevant information from the speech waveform are effectively removed before the encoding process. Thus, only essential information is conveyed to the decoder, where it is used to generate a synthetic speech signal.

Figure 2:
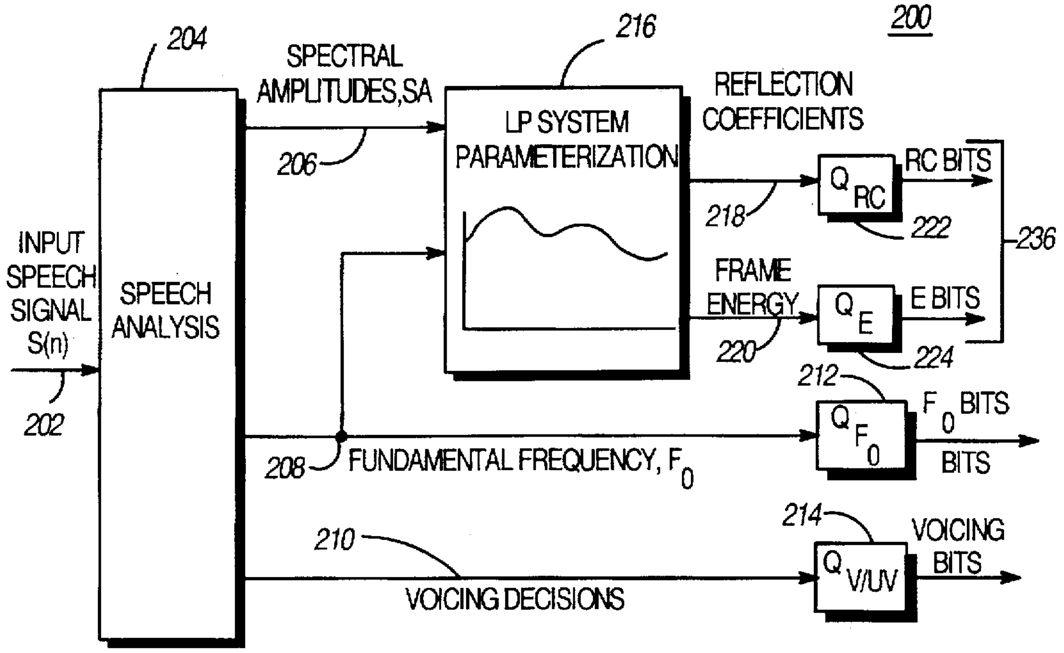
FIG. 2 shows a voice encoder, in accordance with the present invention.

The present invention can be more fully understood with reference to FIGS. 2–7. FIG. 2 shows a block diagram of a voice encoder, in accordance with the present invention. A sampled speech signal, s(n), 202 is inputted into a speech analysis module 204 to be segmented into a plurality of digital information frames. A frame shape characteristic (i.e., embodied as a plurality of spectral envelope samples 206) is then generated for each frame, as well as a fundamental frequency 208. (It should be noted that the fundamental frequency, Fo, indicates the pitch of the speech waveform, and typically takes on values in the range of 65 to 400 Hz.) The speech analysis module 204 might also provide at least one voicing decision 210 for each frame. When conveyed to a speech decoder in accordance with the present invention, the voicing decision information may be used as an input to a speech synthesis module, as is known in the art.

The speech analysis module may be implemented a number of ways. In one embodiment, the speech analysis module might utilize the multi-band excitation model of speech production. In another embodiment, the speech analysis might be done using the sinusoidal transform coder mentioned earlier. Of course, the present invention can be implemented using any analysis that at least segments the speech into a plurality of digital information frames and provides a frame shape characteristic and a fundamental frequency for each frame.

For each frame, the LP system parameterization module 216 determines, from the spectral envelope samples 206 and the fundamental frequency 208, a plurality of reflection coefficients 218 and a frame energy level 220. In the preferred embodiment of the encoder, the reflection coefficients are used to represent coefficients of a linear prediction filter. These coefficients might also be represented using other well known methods, such as log area ratios or line spectral frequencies. The plurality of reflection coefficients 218 and the frame energy level 220 are then quantized using the reflection coefficient quantizer 222 and the frame energy level quantizer 224, respectively, thereby producing a quantized frame parameterization pair 236 consisting of RC bits and E bits, as shown. The fundamental frequency 208 is also quantized using Fo quantizer 212 to produce the Fo bits. When present, the at least one voicing decision 210 is quantized using $Q_{v/uv}$ 214 to produce the V bits, as graphically depicted.

Several methods can be used for quantizing the various parameters. For example, in a preferred embodiment, the reflection coefficients 218 may be grouped into one or more vectors, with the coefficients of each vector being simultaneously quantized using a vector quantizer. Alternatively, each reflection coefficient in the plurality of reflection coefficients 218 may be individually scalar quantized. Other methods for quantizing the plurality of reflection coefficients 218 involve converting them into one of several equivalent representations known in the art, such as log area ratios or line spectral frequencies, and then quantizing the equivalent representation. In the preferred embodiment, the frame energy level 220 is log scalar quantized, the fundamental frequency 208 is scalar quantized, and the at least one voicing decision 210 is quantized using one bit per decision.

Figure 3:
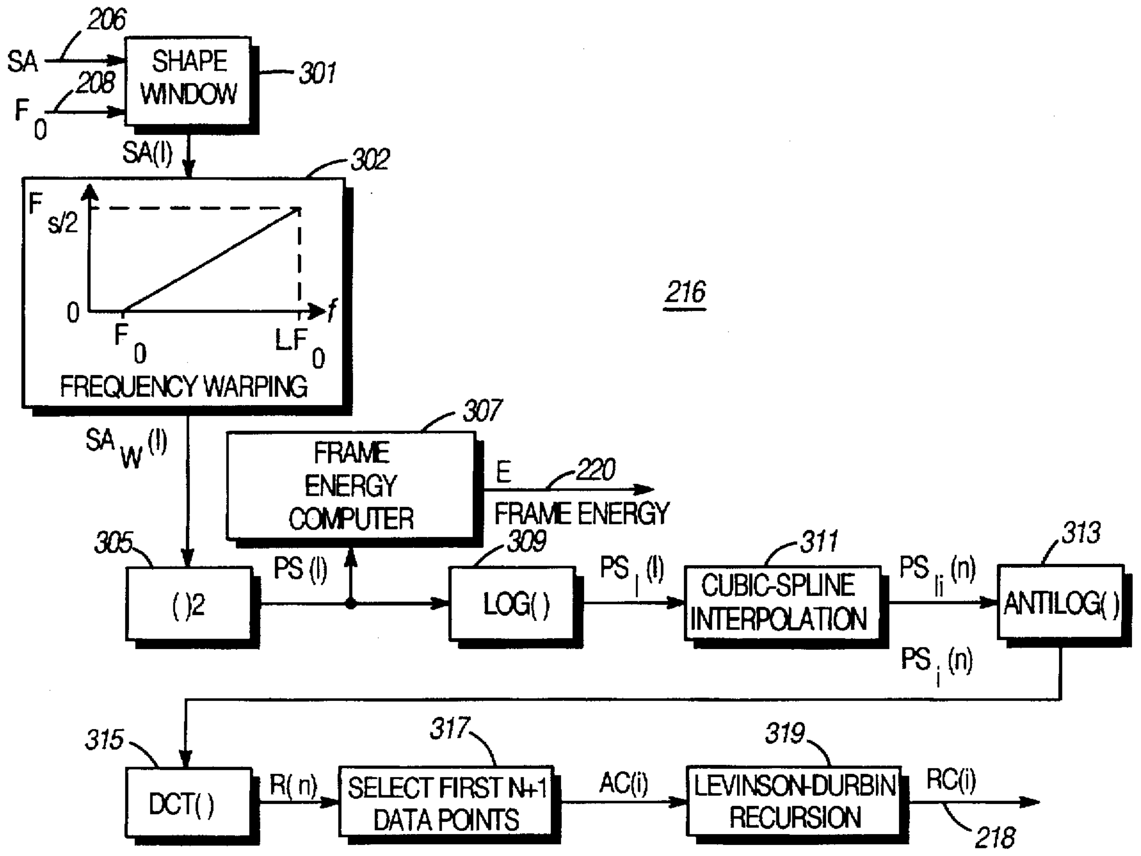
FIG. 3 shows a more detailed view of the linear predictive system parameterization module shown in FIG. 2.

FIG. 3 shows a more detailed view of the LP system parameterization module 216 shown in FIG. 2. According to the invention, a unique combination of elements is used to determine the frame energy level 220 and a small, fixed number of reflection coefficients 218 from the variable and potentially large number of spectral envelope samples. First, the shape window module 301 uses the fundamental frequency 208 to identify the endpoints of a shape window, as next described with reference to FIG. 4. The first endpoint is the fundamental frequency itself, while the other endpoint is a multiple, L, of the fundamental frequency. In a preferred embodiment, L is calculated as:

$$L = \left\lfloor C \cdot \frac{F_{s/2}}{F_0} \right\rfloor \tag{1}$$

where;

$\lfloor x \rfloor$ denotes the greatest integer <=x.

Figure 1:
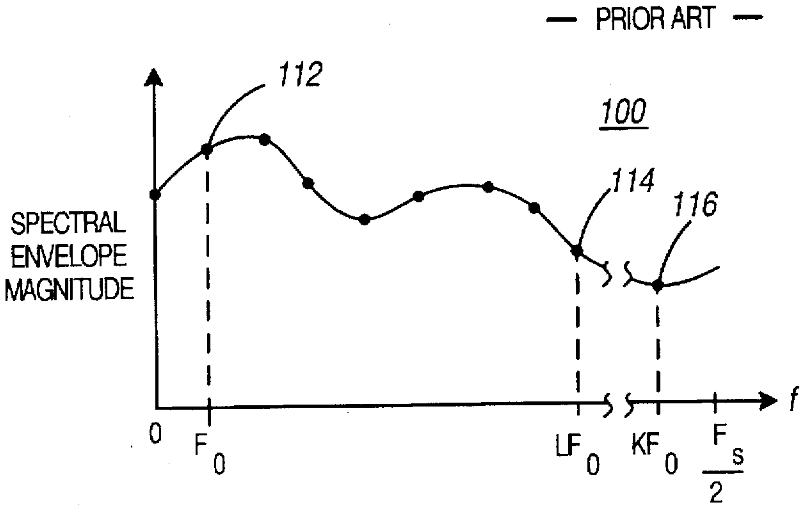
FIG. 1 shows a representative spectral envelope curve and shape characteristic for a speech frame in accordance with speech coding techniques known in the art.
Figure 4:
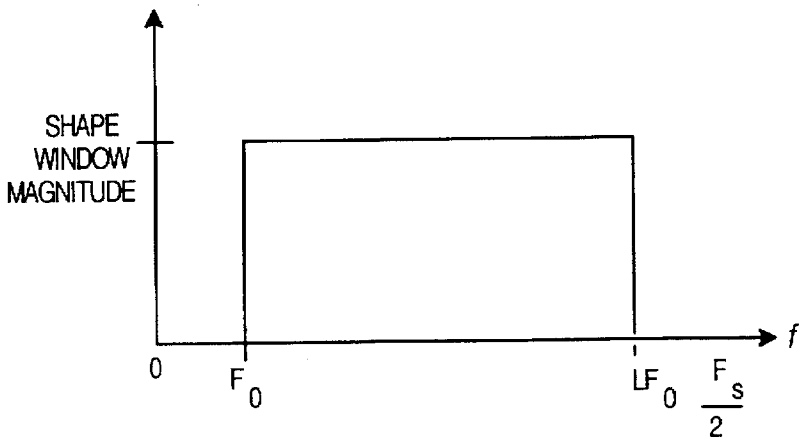
FIG. 4 shows the magnitude spectrum of a representative shape window function used by the shape window module shown in FIG. 3.

FIG. 4 shows the magnitude spectrum of a representative shape window function used by the shape window module shown in FIG. 3. In this simple embodiment, the shape window takes on a value of 1 between the endpoints (Fo, L*Fo) and a value of 0 outside the endpoints (0–Fo and L*Fo–Fs/2). It should be noted that for some applications, it might be desirable to vary the value of the shape window height to give some frequencies more emphasis than others (i.e., weighting). The shape window is applied to the spectral envelope samples 206 (shown in FIG. 2) by multiplying each envelope sample value by the value of the shape window at that frequency. The output of the shape window module is the plurality of non-zero windowed spectral envelope samples, SA(I). In practice, when Fs is equal to or greater than about 7200 Hz, high frequency envelope samples are present in the input that do not contain essential perceptual information. These samples can be eliminated in the shape window module by setting C (in equation 1, above) to less than 1.0. This will result in a value of L that is less than K, as shown in FIG. 1.

Figure 5:
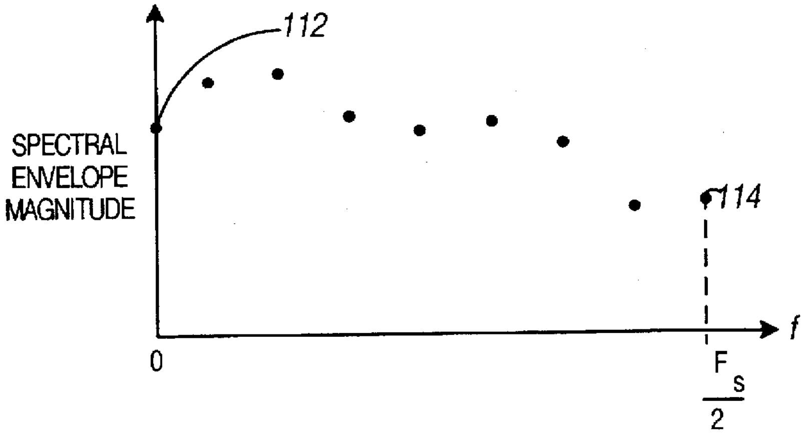
FIG. 5 shows a representative set of warped spectral envelope samples for a speech frame, in accordance with the present invention.

Referring again to FIG. 3, a frequency warping function 302 is then applied to the windowed spectral envelope samples, to produce a plurality of warped samples, $SA_w(I)$, which samples are herein described with reference to FIG. 5. Note that the frequency of sample point 112 is mapped from Fo in FIG. 1 to 0 Hz in FIG. 5. Also, the frequency of sample point 114 is mapped from L*Fo in FIG. 1 to Fs/2 in FIG. 5. The positions along the frequency axis of the sample points between 112 and 114 are also altered by the warping function. Thus, the combined shape window module 301 and frequency warping function 302 effectively identify the perceptually important spectral envelope samples and distribute them along the frequency axis between 0 and Fs/2 Hz.

After warping, the $SA_w(I)$ samples are squared 305, producing a sequence of power spectral envelope samples, PS(I). The frame energy level 220 is then calculated by the frame energy computer 307 as:

$$E = \frac{1}{L} \sum_{l=1}^{L} PS(l) \tag{2}$$

An interpolator is then used to generate a fixed number of power spectral envelope samples that are evenly distributed along the frequency axis from 0 to Fs/2. In a preferred embodiment, this is done by calculating the log 309 of the power spectral envelope samples to produce a PSI(I) sequence, applying cubic-spline interpolation 311 to the PSI(I) sequence to generate a set of 64 envelope samples, $PS_{li}(n)$, and taking the antilog 313 of the interpolated samples, yielding $PS_i(n)$.

An autocorrelation sequence estimator is then used to generate a sequence of N+1 autocorrelation coefficients. In a preferred embodiment, this is done by transforming the $PS_i(n)$ sequence using a discrete cosine transform (DCT) processor 315 to produce a sequence of autocorrelation coefficients, R(n), and then selecting 317 the first N+1 coefficients (e.g., 11, where N=10), yielding the sequence AC(i). Finally, a converter is used to convert the AC(i) sequence into a set of N reflection coefficients, RC(i). In a preferred embodiment, the converter consists of a Levinson-Durbin recursion processor 319, as is known in the art.

Figure 6:
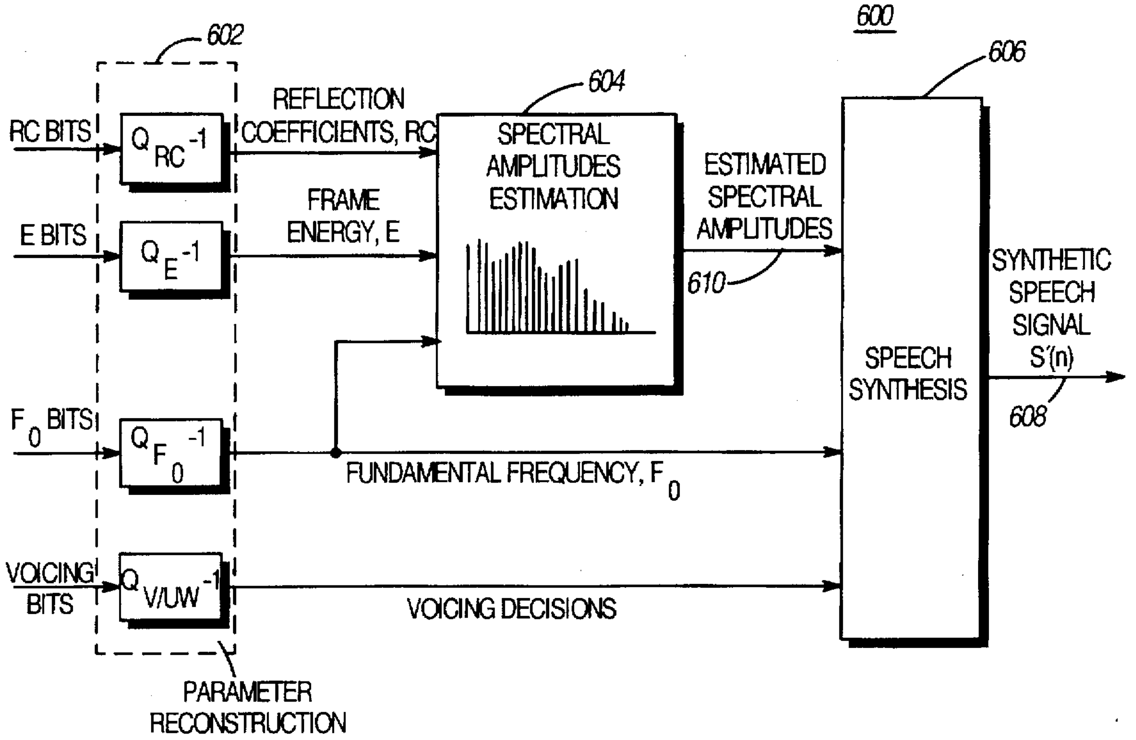
FIG. 6 shows a voice decoder, in accordance with the present invention.

FIG. 6 shows a block diagram of a voice decoder, in accordance with the present invention. The voice decoder 600 includes a parameter reconstruction module 602, a spectral amplitudes estimation module 604, and a speech synthesis module 606. In the parameter reconstruction module 602, the received RC, E, Fo, and (when present) V bits for each frame are used respectively to reconstruct numerical values for their corresponding parameters—i.e., reflection coefficients, frame energy level, fundamental frequency, and the at least one voicing decision. For each frame, the spectral amplitudes estimation module 604 then uses the reflection coefficients, frame energy, and fundamental frequency to generate a set of estimated spectral amplitudes 610. Finally, the estimated spectral amplitudes 610, fundamental frequency, and (when present) at least one voicing decision produced for each frame are used by the speech synthesis module 606 to generate a synthetic speech signal 608.

In one embodiment, the speech synthesis might be done according to the speech synthesis algorithm used in the IMBE speech coder. In another embodiment, the speech synthesis might be based on the speech synthesis algorithm used in the STC speech coder. Of course, any speech synthesis algorithm can be employed that generates a synthetic speech signal from the estimated spectral amplitudes 610, fundamental frequency, and (when present) at least one voicing decision, in accordance with the present invention.

Figure 7:
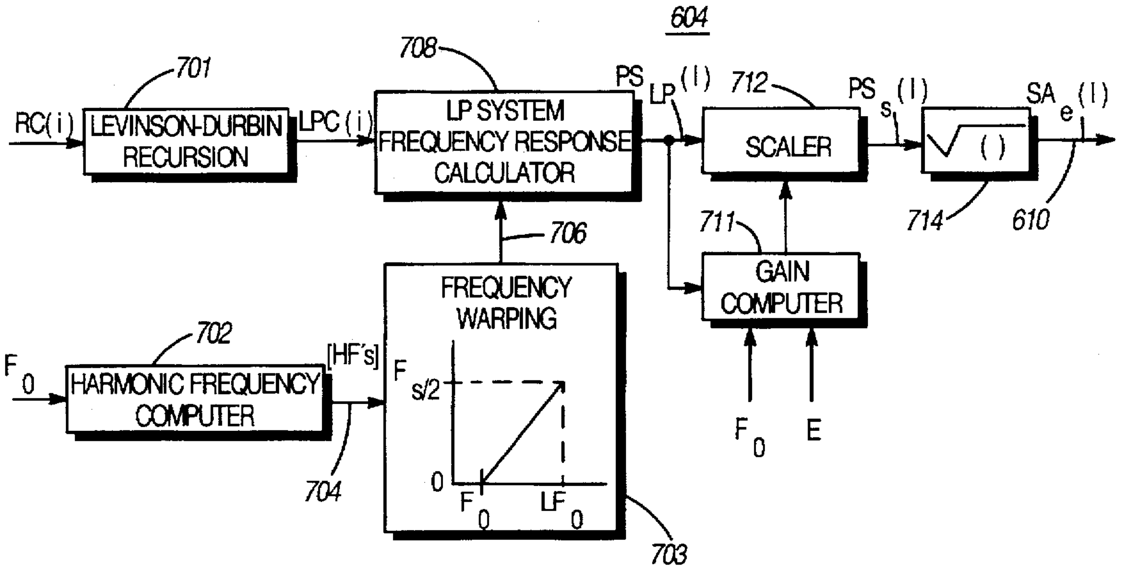
FIG. 7 shows a more detailed view of the spectral amplitudes estimator shown in FIG. 5.

FIG. 7 shows a more detailed view of the spectral amplitudes estimation module 604 shown in FIG. 6. In this module, a combination of elements is used to estimate a set of L spectral amplitudes from the input reflection coefficients, fundamental frequency, and frame energy level. This is done using a Levinson-Durbin recursion module 701 to convert the inputted plurality of reflection coefficients, RC(i), into an equivalent set of linear prediction coefficients, LPC(i). In an independent process, a harmonic frequency computer 702 generates a set of harmonic frequencies 704, that constitute the first L harmonics (including the fundamental) of the inputted fundamental frequency. (It is noted that equation 1 above is used to determine the value of L.) A frequency warping function 703 is then applied to the harmonic frequencies 704 to produce a plurality of sampling frequencies 706. It should be noted that the frequency warping function 703 is, in a preferred embodiment, identical to the frequency warping function 302 shown in FIG. 3. Next, an LP system frequency response calculator 708 computes the value of the power spectrum of the LP system represented by the LPC(i) sequence at each of the sampling frequencies 706 to produce a sequence of LP system power spectrum samples, denoted $PS_{LP}(I)$. A gain computer 711 then calculates a gain factor G according to:

$$G = \frac{E}{\frac{1}{L}\sum_{l=1}^{L} PS_{LP}(l)} \tag{3}$$

A scaler 712 is then used to scale each of the $PS_{LP}(I)$ sequence values by the gain factor G, resulting in a sequence of scaled power spectrum samples, $PS_s(I)$. Finally, the square root 714 of each of the $PS_s(I)$ values is taken to generate the sequence of estimated spectral amplitudes 610.

In the foregoing manner, the present invention represents an improvement over the prior art in that the redundant and irrelevant information in the spectral envelope outside the shaping window is discarded. Further, the essential spectral envelope information within the shaping window is efficiently coded as a small, fixed number of coefficients to be conveyed to the decoder. This efficient representation of the essential information in the spectral envelope enables the present invention to achieve voice quality comparable to that of existing 4 to 13 kpbs speech coders while operating at bit rates below 4 kbps.

Additionally, since the number of reflection coefficients per frame is constant, the present invention facilitates operation at fixed bit rates, without requiring a dynamic bit allocation scheme that depends on the fundamental frequency. This avoids the problem in the prior art of needing to correctly reconstruct the pitch in order to reconstruct the quantized spectral amplitude values. Thus, encoders embodying the present invention are not as sensitive to fundamental frequency bit errors as are other speech coders that require dynamic bit allocation.

What is claimed is:

1. In a voice encoder, a method of encoding a plurality of digital information frames, comprising the steps of:

providing, for each of the plurality of digital information frames, an estimate of the digital information frame that includes at least a plurality of spectral envelope samples;

identifying for at least one of the plurality of digital information frames, a fundamental frequency associated therewith;

using the fundamental frequency to identify a shape window;

applying the shade window to the spectral envelope samples to produce a plurality of windowed spectral envelope samples; and using the windowed spectral envelope samples to generate a plurality of shape parameters.

2. The method of claim 1 wherein the estimate of the digital information frame further includes a frame energy level, further comprising the step of:

quantizing the frame energy level and the plurality of shape parameters to produce a quantized frame parameterization pair.

3. The method of claim 2, further comprising the step of:

using at least the quantized frame parameterization pair to produce an encoded information stream.

4. The method of claim 1, further comprising the step of:

providing, for each of the plurality of digital information frames, at least one voicing decision.

5. The method of claim 4, further comprising the step of:

quantizing the at least one voicing decision and the fundamental frequency.

6. The method of claim 1, further comprising the steps of:

using the fundamental frequency, F0, and a sampling rate, Fs, to determine a warping function; and using the warping function to redistribute the samples of the frame shape characteristics between 0 Hz and Fs/2 Hz.

7. In a voice decoder, a method of decoding a plurality of digital information frames, comprising the steps of:

obtaining, for each of the plurality of digital information frames, a plurality of shape parameters and a fundamental frequency;

using the plurality of shape parameters to reconstruct a frame shape;

using the fundamental frequency to determine a warping function;

using the warping function to identify a plurality of sampling points at which the frame shape is to be sampled; and sampling the frame shape at the plurality of sampling points to produce a plurality of sampled shape indicators.

8. The method of claim 7, further comprising the steps of:

obtaining a frame energy level for each of the plurality of digital information frames; and scaling, based at least in part on the fundamental frequency and the frame energy level, the plurality of sampled shape indicators, to produce a plurality of scaled shape indicators.

9. The method of claim 7, further comprising the step of:

obtaining at least one voicing decision for each of the digital information frames.

10. The method of claim 9, further comprising the step of:

using the at least one voicing decision and the plurality of scaled shape indicators to generate a plurality of waveforms representative of the digital information frames.

11. The method of claim 7, wherein the step of using the warping function comprises the step of mapping a plurality of fundamental frequency harmonics to produce the plurality of sampling points.

12. In a data transmission system that includes a transmitting device and a receiving device, a method comprising the steps of:

at the transmitting device;

providing, for a digital information frame to be presently transmitted, an estimate of the digital information frame that includes at least a frame shape characteristic;

identifying, for the digital information frame to be presently transmitted, a fundamental frequency, $F_0$, and a sampling frequency, $F_s$, associated therewith;

using the fundamental frequency to identify a shape window;

matching, within the shape window, the frame shape characteristic with a predetermined shape function to produce a plurality of shape parameters; and transmitting the plurality of shape parameters to the receiving device.

at the receiving device;

receiving the plurality of shape parameters and the fundamental frequency;

using the plurality of shape parameters to reconstruct a frame shape;

using the fundamental frequency to determine a warping function;

using the warping function to identify a plurality of sampling points at which the frame shape is to be sampled; and sampling the frame shape at the plurality of sampling points to produce a plurality of sampled shape indicators.

13. The method of claim 12 wherein the estimate of the digital information frame further includes a frame energy level, further comprising the step of:

quantizing the frame energy level and the plurality of shape parameters to produce a quantized frame parameterization pair.

14. The method of claim 12, further comprising the step of:

providing at least one voicing decision for association with the digital information frame; and quantizing the at least one voicing decision and the fundamental frequency.

15. The method of claim 14, further comprising the step of, at the receiving device:

using the at least one voicing decision and the plurality of scaled shape indicators to generate a waveform representative of the digital information frame.

16. The method of claim 12, further comprising the step of:

using the fundamental frequency, $F_0$, and a sampling rate, $F_s$, to determine a warping function;

and wherein the step of providing an estimate of the digital information frame to be presently transmitted further comprises the steps of:

obtaining samples of the frame shape characteristic at a plurality of frequencies between $F_0$ Hz and an integer multiple of $F_0$ Hz; and using the warping function to redistribute the samples of the frame shape characteristic between 0 Hz and Fs/2 Hz.

17. The method of claim 12, further comprising the steps of, at the receiving device,:

receiving a frame energy level associated with the digital information frame; and scaling, based at least in part on the fundamental frequency and the frame energy level, the plurality of sampled shape indicators, to produce a plurality of scaled shape indicators.

18. The method of claim 12, wherein the step of using the warping function comprises the step of mapping a plurality of fundamental frequency harmonics to produce the plurality of sampling points.

19. A voice encoder, comprising:

a sample producer, operating at a sampling frequency, $F_s$, that provides a plurality of power spectral envelope samples, PS, representative of a spectral amplitude signal;

an estimator, operably coupled to the sample producer, that estimates a nominal frame energy level, E, according to:

$$E=\frac{1}{L}\sum_{l=1}^{L} PS(l)$$

wherein L represents a shape window size;

an interpolator, operably coupled to an output of the estimator, that distributes the power spectral envelope samples between 0 Hz and Fs/2 Hz;

an autocorrelation sequence estimator, operably coupled to the interpolator, that produces autocorrelation coefficients; and a converter, operably coupled to an output of the autocorrelation sequence estimator, that produces a plurality of reflection coefficients.

20. The encoder of claim 19, wherein the autocorrelation sequence estimator comprises a discrete cosine transform processor.

21. The encoder of claim 19, wherein the converter comprises a Levinson-Durbin recursion processor.

22. A voice decoder, comprising:

a converter that converts a plurality of received reflection coefficients into a set of linear prediction coefficients;

a non-linear frequency mapper that uses a plurality of fundamental frequency harmonics to compute a plurality of sample frequencies;

a frequency response calculator, operably coupled to the non-linear frequency mapper and the converter, that produces a plurality of power spectral envelope samples, $PS_{LP}$, at the plurality of fundamental frequency harmonics;

a scaler, operably coupled to the frequency response calculator, that scales the plurality of power spectral envelope samples by a gain factor, G.

23. The decoder of claim 22, further comprising an estimator, operably coupled to the scaler, that produces a plurality of spectral amplitude estimates.

24. The decoder of claim 22, wherein the gain factor, G, is calculated according to:

$$G = \frac{E}{\frac{1}{L}\sum_{l=1}^{L} PS_{LP}(l)}$$

wherein

L represents a shape window size; and

E represents a frame energy level.

25. The decoder of claim 22, wherein the converter comprises a Levinson-Durbin recursion processor.

* * * * *